(12) United States Patent
Ng

(10) Patent No.: US 7,696,264 B2
(45) Date of Patent: *Apr. 13, 2010

(54) SILICON-CONTAINING POLYTRIMETHYLENE HOMO- OR COPOLYETHER COMPOSITION

(75) Inventor: Howard C. Ng, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/570,434

(22) Filed: Sep. 30, 2009

(65) Prior Publication Data

US 2010/0016622 A1 Jan. 21, 2010

Related U.S. Application Data

(60) Division of application No. 12/079,612, filed on Mar. 27, 2008, now Pat. No. 7,629,396, which is a continuation-in-part of application No. 11/064,649, filed on Feb. 23, 2005, now abandoned.

(51) Int. Cl.
*C09D 11/02* (2006.01)
*C09D 11/10* (2006.01)
*C08L 101/10* (2006.01)

(52) U.S. Cl. ......................... 523/160; 528/29
(58) Field of Classification Search ................. 523/160
See application file for complete search history.

(56) References Cited

U.S. PATENT DOCUMENTS

| | | | |
|---|---|---|---|
| 2,520,733 A | 8/1950 | Morris et al. | |
| 2,520,773 A | 8/1950 | Morris et al. | |
| 3,326,985 A | 6/1967 | Mason | |
| 3,541,031 A | 11/1970 | Boudreau | |
| 3,833,512 A | 9/1974 | Prokai et al. | |
| 5,015,789 A | 5/1991 | Arntz et al. | |
| 5,276,201 A | 1/1994 | Haas et al. | |
| 5,284,979 A | 2/1994 | Haas et al. | |
| 5,334,778 A | 8/1994 | Haas et al. | |
| 5,364,984 A | 11/1994 | Arntz et al. | |
| 5,364,987 A | 11/1994 | Haas et al. | |
| 5,633,362 A | 5/1997 | Nagarajan et al. | |
| 5,686,276 A | 11/1997 | Laffend et al. | |
| 5,719,251 A | 2/1998 | Wilczek et al. | |
| 5,821,092 A | 10/1998 | Nagarajan et al. | |
| 5,962,745 A | 10/1999 | Brossmer et al. | |
| 6,080,816 A | 6/2000 | Gregorovich et al. | |
| 6,140,543 A | 10/2000 | Brossmer et al. | |
| 6,232,511 B1 | 5/2001 | Haas et al. | |
| 6,268,456 B1 | 7/2001 | Gregorovich et al. | |
| 6,277,289 B1 | 8/2001 | Kurian et al. | |
| 6,297,408 B1 | 10/2001 | Haas et al. | |
| 6,329,489 B1 | 12/2001 | Gregorovich et al. | |
| 6,331,264 B1 | 12/2001 | Kurian et al. | |
| 6,342,646 B1 | 1/2002 | Haas et al. | |
| 6,562,457 B1 | 5/2003 | Goldfinger et al. | |
| 6,590,065 B1 | 7/2003 | Goldfinger | |
| 6,599,625 B2 | 7/2003 | Goldfinger et al. | |
| 6,608,168 B1 | 8/2003 | Ng | |
| 6,720,459 B2 | 4/2004 | Sunkara et al. | |
| 6,737,482 B1 | 5/2004 | Ando et al. | |
| 6,852,823 B2 | 2/2005 | Sunkara et al. | |
| 2002/0007043 A1 | 1/2002 | Sunkara et al. | |
| 2002/0010374 A1 | 1/2002 | Sunkara et al. | |
| 2004/0025892 A1 | 2/2004 | Kreyenberg | |
| 2004/0030089 A1 | 2/2004 | Sunkara | |
| 2004/0030095 A1 | 2/2004 | Sunkara et al. | |
| 2004/0077823 A1 | 4/2004 | Sunkara | |
| 2004/0127673 A1 | 7/2004 | Sunkara | |
| 2004/0132951 A1 | 7/2004 | Burkhart et al. | |
| 2004/0225107 A1 | 11/2004 | Sunkara et al. | |
| 2004/0225161 A1 | 11/2004 | Sunkara et al. | |
| 2004/0225162 A1 | 11/2004 | Sunkara et al. | |
| 2004/0225163 A1 | 11/2004 | Sunkara et al. | |
| 2004/0249061 A1 | 12/2004 | Sunkara et al. | |
| 2004/0258923 A1 | 12/2004 | Sormani et al. | |
| 2004/0260125 A1 | 12/2004 | Seapan et al. | |
| 2005/0014661 A1 | 1/2005 | Sunkara | |
| 2005/0020805 A1 | 1/2005 | Sunkara et al. | |
| 2005/0069997 A1 | 3/2005 | Adkesson et al. | |
| 2005/0283028 A1 | 12/2005 | Sunkara et al. | |

FOREIGN PATENT DOCUMENTS

| | | |
|---|---|---|
| EP | 0671437 A | 9/1995 |
| EP | 1167451 A | 1/2002 |
| JP | 6 329739 | 11/1994 |
| JP | 6329739 | 11/1994 |
| WO | 0144348 A | 6/2001 |
| WO | 0210298 A1 | 2/2002 |
| WO | WO 02/10298 A1 | 2/2002 |

OTHER PUBLICATIONS

Shaobing Wu, Matthew T. Sears, Mark D. Soucek, Progress in Organic Coatings 36, "Siloxane Modified Cycloaliphatic Epoxide UV Coatings", Elsevier Science S.A., (1999), pp. 89-101.
Shaobing Wu, Matthew T. Sears, Mark D. Soucek, Polymer 40, "Synthesis of Reactive Diluents for Cationic Cycloaliphatic Epoxide UV Coatings", Elsevier Science Ltd., (1999), pp. 5675-5686.
Wu et al., Progress in Organic Coatings 36, Siloxane Modified Cycloaliphatic Epdxide UV Coatings, Elsevier Science S.A., 1999, pp. 89-101.
Wu et al., Polymer 40, Synthesis of Reactive Diluents for Cationic Cycloaliphatic Epoxide UV Coatings, Elsevier Science Ltd., 1999, pp. 5675-5686.

*Primary Examiner*—Randy Gulakowski
*Assistant Examiner*—Robert Loewe
(74) *Attorney, Agent, or Firm*—Gail D. Tanzer

(57) ABSTRACT

Processes for preparing silicon-containing polytrimethylene homo- or copolyethers, wherein at least a portion of the polymer end groups are silicon-containing end groups, are provided.

8 Claims, No Drawings

SILICON-CONTAINING POLYTRIMETHYLENE HOMO- OR COPOLYETHER COMPOSITION

CROSS-REFERENCE TO RELATED APPLICATION

This application is a divisional of U.S. patent application Ser. No. 12/079,612, filed Mar. 27, 2008, which is a continuation-in-part of U.S. patent application Ser. No. 11/064,649 filed Feb. 23, 2005.

FIELD OF THE INVENTION

This invention relates to processes for preparing polytrimethylene homo- or copolyethers having silicon-containing end groups.

BACKGROUND OF THE INVENTION

In UV curable cationic coatings, photoinitiators generate cationic species, which then function as catalysts for cationic polymerization. Epoxides, in particular cycloaliphatic epoxides, are the major reactive monomer/oligomers used for cationic UV cured coatings.

Typically, two types of crosslinkers are available for these coatings, low molecular weight alcohols and high molecular weight polyols. High molecular weight polyol crosslinkers, such as polyester, polyether, or caprolactone polyols, provide excellent flexibility; however, they are generally viscous, and as a consequence increase application related problems. Low molecular weight alcohols can reduce the viscosity of the coating formulations. However, they are volatile and lack the flexibility needed for most coating applications.

Homo- or copolyethers of 1,3-propanediol also can be used as crosslinkers for cationic UV curable coatings. However, they would have a greater effect if their functionality could be increased from the original 2 (i.e., 2 hydroxyls per molecule). Moreover, conversion of the hydroxyl end groups to a non-hydrogen bonding species would also serve to reduce viscosity.

U.S. Pat. No. 3,833,512 discloses organosilicon polymers containing monomeric units (A), (B) and (C) where (A) is an inorganic tetravalent silicon containing units, where all valencies of the Si atoms are saturated by oxygen linkages, (B) is polyvalent silicon containing units where 2-3 valencies of the silicon are linked to oxygen and at least 1 is linked to a carbon atom of an organic group containing a poly(oxyalkylene) chain, and (C) is monovalent silicon containing units where 1 valency is linked to oxygen and the other 3 are saturated by monovalent organic compounds, the mole ratio (A) to (B) to (C) being 0.4-2:1:0.2-2 respectively.

U.S. Pat. No. 6,737,482 discusses curable resin compositions comprising: (1) a reactive silicon group containing polyoxyalkylene polymer and epoxy resin, wherein the introduction rate of the reactive silicon into a molecular chain terminus is not less than 85% as analyzed by NMR spectroscopy, and (2) an epoxy resin.

SUMMARY OF THE INVENTION

One aspect of the present invention is a process for preparing a silicon-containing polytrimethylene homo- or copolyether comprising: providing reactants comprising:
(a) polytrimethylene homo- or copolyether ether glycol, wherein from about 50 to 100 mole mole percent of the repeating units of the polytrimethylene homo- or copolyether are trimethylene ether units, and wherein the polytrimethylene homo- or copolyether has an Mw/Mn ratio of 1.7 or greater; and
(b) a silicon-containing reactant of the formula: Si(W)(X)(Y)(Z), where W, X and Y are groups that are easily displaceable from silicon by reaction with water and/or alcohols, and Z is selected from the group consisting of: (i) C1-C20 linear or branched alkyl groups, (ii) cycloaliphatic groups, (iii) aromatic groups, each of (i), (ii) and (iii) being optionally substituted with a member selected from the group consisting of O, N, P and S, (iv) hydrogen, and (v) groups that are easily displaceable from silicon by water and/or alcohol; and
(c) contacting said polytrimethylene homo- or copolyether ether glycol reactant in (a) with said silicon-containing reactant in (b) at elevated temperature.

DETAILED DESCRIPTION

Unless stated otherwise, all percentages, parts, ratios, etc., are by weight. Trademarks are shown in upper case. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The silicon-containing polytrimethylene homo- or copolyethers of the invention are preferably prepared by reaction of one or more polytrimethylene homo- or polyether glycols with a silicon-containing reactant. Polytrimethylene homo- or polyether glycols are preferably prepared by polycondensation of monomers comprising 1,3-propanediol, thus resulting in polymers or copolymers containing: —{CH$_2$CH$_2$—CH$_2$—O—}—, or trimethylene ether repeating units. For the purposes of the invention, at least 50% of the repeating units are trimethylene ether units. Preferably, from about 75 to 100, more preferably from about 90 to 100, and most preferably from about 99 to 100 mole percent of the repeating units are trimethylene ether units. Thus, minor amounts of other polyalkylene ether repeating units may be present also. Preferably these are derived from aliphatic diols other than 1,3-propanediol. Examples of typical aliphatic diols that may used include those derived from aliphatic diols, for example ethylene glycol, 1,6-hexanediol, 1,7-heptanediol, 1,8-octanediol, 1,9-nonanediol, 1,10-decanediol, 1,12-dodecanediol, 3,3,4,4,5,5-hexafluoro-1,5-pentanediol, 2,2,3,3,4,4,5,5-octafluoro-1,6-hexanediol, and 3,3,4,4,5, 5,6,6,7,7,8,8,9,9,10,10-hexadecafluoro-1,12-dodecanediol, cycloaliphatic diols, for example 1,4-cyclohexanediol, 1,4-cyclohexanedimethanol and isosorbide. A preferred group of aliphatic diols is selected from the group consisting of ethylene glycol, 2-methyl-1,3-propanediol, 2,2-dimethyl-1,3-propanediol, 2,2-diethyl-1,3-propanediol, 2-ethyl-2-(hydroxymethyl)-1,3-propanediol, 1,6-hexanediol, 1,8-octanediol, 1,10-decanediol, isosorbide, and mixtures thereof. The most preferred diol other than 1,3-propanediol is ethylene glycol.

The polytrimethylene homo- or copolyethers that are the basis for the invention described herein are preferably selected from the group consisting of polytrimethylene ether, poly(trimethylene-ethylene ether), random poly(trimethylene ether ester), and mixtures thereof. The silicon-containing derivatives of these, which are the subject of the invention, are preferably prepared by reaction of the corresponding glycols (i.e., polyethers with hydroxyl end groups) with a silicon-containing reactant. The 1,3-propanediol employed for preparing the polytrimethylene homo- or copolyether glycols that are employed for reaction with silicon-containing reactants may be obtained by any of the various chemical routes or by biochemical transformation routes, the latter resulting in biologically produced 1,3-propanediol. Preferred routes are described in U.S. Pat. Nos. 5,015,789, 5,276,201, 5,284,979, 5,334,778, 5,364,984, 5,364,987, 5,633,362, 5,686,276, 5,821,092, 5,962,745, 6,140,543, 6,232,511, 6,277,289, 6,297,408, 6,331,264 and 6,342,646, U.S. patent application Ser. No. 10/839,188, filed May 5, 2004, US 2004-0260125A1 and US 2004-0225161 A1, all of which are in their entireties.

Biologically produced 1,3-propanediol represents a new feedstock for useful polymers. Polymer derived at least partly from biologically produced 1,3-propanediol may be distinguished from polymer derived from all petrochemical carbon on the basis of dual carbon-isotopic fingerprinting. Additionally, the specific source of biosourced carbon (e.g. glucose vs. glycerol) can be determined by dual carbon-isotopic fingerprinting. This method usefully distinguishes otherwise chemically-identical materials, and apportions carbon in the copolymer by source (and possibly year) of growth of the biospheric (plant) component. The isotopes, 14C and $^{13}C$, bring complementary information to this problem. The radiocarbon dating isotope ($^{14}C$), with its nuclear half life of 5730 years, clearly allows one to apportion specimen carbon between fossil ("dead") and biospheric ("alive") feedstocks [Currie, L. A. "Source Apportionment of Atmospheric Particles," *Characterization of Environmental Particles*, J. Buffle and H. P. van Leeuwen, Eds., 1 of Vol. I of the IUPAC Environmental Analytical Chemistry Series (Lewis Publishers, Inc) (1992) 3-74]. The basic assumption in radiocarbon dating is that the constancy of 14C concentration in the atmosphere leads to the constancy of 14C in living organisms. When dealing with an isolated sample, the age of a sample can be deduced approximately by the relationship $t=(-5730/0.693)\ln(A/A_0)$, where t=age, 5730 years is the half-life of radiocarbon, and A and Ao are the specific 14C activity of the sample and of the modern standard, respectively [Hsieh, Y., *Soil Sci. Soc. Am J.*, 56, 460, (1992)]. However, because of atmospheric nuclear testing since 1950 and the burning of fossil fuel since 1850, 14C has acquired a second, geochemical time characteristic. Its concentration in atmospheric CO2—and hence in the living biosphere—approximately doubled at the peak of nuclear testing, in the mid-1960s. It has since been gradually returning to the steady-state cosmogenic (atmospheric) baseline isotope rate ($^{14}C/^{12}C$) of ca. $1.2 \times 10^{-12}$, with an approximate relaxation "half-life" of 7-10 years. (This latter half-life must not be taken literally; rather, one must use the detailed atmospheric 30 nuclear input/decay function to trace the variation of atmospheric and biospheric $^{14}C$ since the onset of the nuclear age.) It is this latter biospheric $^{14}C$ time characteristic that holds out the promise of annual dating of recent biospheric carbon. $^{14}C$ can be measured by accelerator mass spectrometry (AMS), with results given in units of "fraction of modern carbon" ($f_M$). fM is defined by National Institute of Standards and Technology (NIST) Standard Reference Materials (SRMs) 4990B and 4990C, known as oxalic acids standards HOxI and HOxII, respectively. The fundamental definition relates to 0.95 times the $^{14}C/^{12}C$ isotope ratio HOxI (referenced to AD 1950). This is roughly equivalent to decay-corrected pre-industrial Revolution wood. For the current living biosphere (plant material), $f_M 1.1$.

The stable carbon isotope ratio ($^{13}C/^{12}C$) provides a complementary route to source discrimination and apportionment. The $^{13}C/^{12}C$ ratio in a given biosourced material is a consequence of the $^{13}C/^{12}C$ ratio in atmospheric carbon dioxide at the time the carbon dioxide is fixed and also reflects the precise metabolic pathway. Regional variations also occur. Petroleum, C3 plants (the broadleaf), C4 plants (the grasses), and marine carbonates all show significant differences in $13C/^{12}C$ and the corresponding $8^{13}C$ values. Furthermore, lipid matter of C3 and C4 plants analyze differently than materials derived from the carbohydrate components of the same plants as a consequence of the metabolic pathway. Within the precision of measurement, 13C shows large variations due to isotopic fractionation effects, the most significant of which for the instant invention is the photosynthetic mechanism. The major cause of differences in the carbon isotope ratio in plants is closely associated with differences in the pathway of photosynthetic carbon metabolism in the plants, particularly the reaction occurring during the primary carboxylation, i.e., the initial fixation of atmospheric $CO_2$. Two large classes of vegetation are those that incorporate the "$C_3$" (or Calvin-Benson) photosynthetic cycle and those that incorporate the "C4" (or Hatch-Slack) photosynthetic cycle. C3 plants, such as hardwoods and conifers, are dominant in the temperate climate zones. In C3 plants, the primary CO2 fixation or carboxylation reaction involves the enzyme ribulose-1,5-diphosphate carboxylase and the first stable product is a 3-carbon compound. C4 plants, on the other hand, include such plants as tropical grasses, corn and sugar cane. In C4 plants, an additional carboxylation reaction involving another enzyme, phosphoenol-pyruvate carboxylase, is the primary carboxylation reaction. The first stable carbon compound is a 4-carbon acid which is subsequently decarboxylated. The CO2 thus released is refixed by the C3 cycle. Both C4 and C3 plants exhibit a range of $13C/^{12}C$ isotopic ratios, but typical values are ca. −10 to −14 per mil ($C_4$) and −21 to −26 per mil ($C_3$) [Weber et al., *J. Agric. Food Chem.*, 45, 2942 (1997)]. Coal and petroleum fall generally in this latter range. The 13 C measurement scale was originally defined by a zero set by pee dee belemnite (PDB) limestone, where values are given in parts per thousand deviations from this material. The "$8^{13}C$", values are in parts per thousand (per mil), abbreviated %o., and are calculated as follows:

$$\delta^{13}C = [(^{13}C/^{12}C)_{sample} - (^{13}C/^{12}C)_{standard} / (^{13}C/^{12}C)_{standard}] \times 100\%$$

Since the PDB reference material (RM) has been exhausted, a series of alternative RMs have been developed in cooperation with the IAEA, USGS, NIST, and other selected international isotope laboratories. Notations for the per mil deviations from PDB is $\&^3C$. Measurements are made on CO2 by high precision stable ratio mass spectrometry (IRMS) on molecular ions of masses 44, 45 and 46.

Biosourced 1,3-propanediol and resulting polyols may be completely distinguished from their petrochemical derived counterparts on the basis of '4 C (fm) and dual carbon-isotopic fingerprinting, indicating new compositions of matter. In fact, a U.S. patent on this new composition of matter was granted on Jan. 30, 2007 (U.S. Pat. No. 7,169,588).

The most preferred source of 1,3-propanediol is a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found e.g., in the species *Klebsiella, Citrobacter, Clostridium,* and *Lactobacillus*. The technique is disclosed in several patents, including, U.S. Pat. Nos. 5,633,362, 5,686,276, and 5,821,092. In U.S. Pat. No. 5,821,092, Nagarajan et al. disclose, inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the process of the invention provided a rapid, inexpensive and environmentally responsible source of 1,3-propanediol monomer.

The 1,3-propanediol starting material for the present invention may also contain small amounts, preferably no more than about 20%, more preferably no more than about 10%, by weight, of the starting material, of comonomer diols in addition to the reactant 1,3-propanediol or its dimers and trimers without detracting from the products and processes of the invention. Examples of preferred comonomer diols include ethylene glycol, 2-methyl-1,3-propanediol, 2,2-dimethyl-1,3-propane diol and $C_6$-$C_{12}$ diols such as 2,2-diethyl-1,3-propane diol, 2-ethyl-2-(hydroxymethyl)-1,3-propane diol, 1,6-hexanediol, 1,8-octanediol, 1,10-decanediol, 1,12-dodecanediol, 1,4-cyclohexanediol, and 1,4-cyclohexanedimethanol. A more preferred comonomer diol is ethylene glycol. Preferably the 1,3-propanediol used as the reactant or as a component of the reactant will have a purity of greater than about 99% by weight as determined by gas chromatographic analysis.

Methods for preparation of the first preferred polytrimethylene homo- or copolyether glycol, polytrimethylene ether glycol, by dehydration of 1,3-propanediol or by ring opening polymerization of oxetane are well known in the art.

U.S. Pat. No. 2,520,733, discloses polymers and copolymers of trimethylene glycol of molecular weight from about 100 to about 10,000 and a process for the preparation of these polymers from 1,3-propanediol in the presence of a dehydration catalyst such as iodine, inorganic acids (e.g. sulfuric acid) and organic acids. U.S. Pat. No. 3,326,985, discloses a process for forming a polytrimethylene ether glycol having an average molecular weight of 1,200-1,400. First, polytrimethylene ether glycol which has an average molecular weight of about 900 is formed using hydriodic acid dehydration catalyst. This is followed by an after treatment which comprises vacuum stripping the polyglycol at a temperature in the range of 220-240° C. and at a pressure of 1-8 mm Hg in a current of nitrogen for from 1-6 hours. U.S. Pat. No. 6,720,459, which is incorporated herein by reference, discloses a continuous process for preparation of polytrimethylene ether glycol from 1,3-propanediol using a polycondensation catalyst, preferably an acid catalyst. The process provides high purity polytrimethylene ether glycol having a number average molecular weight of at least about 1,000. U.S. Patent Application Publication No. 2002/0007043, describes polytrimethylene ether glycol obtained from acid catalyzed polymerization of 1,3-propanediol reactant selected from the group consisting of 1,3-propanediol and/or its oligomers or prepolymers having a degree of polymerization of 2 to 9. The polymerization product is subjected to a purification process comprising (1) a hydrolysis step to hydrolyze the acid esters formed during the acid catalyzed polymerization, (2) phase separation and water extraction steps to remove the soluble acid catalyst, generating an organic phase and a waste aqueous phase, (3) a base treatment of the organic phase to neutralize and precipitate the residual acid present, and (4) drying and filtration of the polymer to remove residual water and solids. The process provides high purity polytrimethylene ether glycol having a number average molecular weight of at least about 1,000.

Polytrimethylene ether glycols having molecular weights lower than about 1,000 are preferably prepared by a process that avoids the water washing step conventionally used in purification, because the water washing may cause the loss of significant amounts of water sensitive oligomeric polytrimethylene ether glycol. For this reason a preferred method of preparation for material of these low molecular weights avoids the hydrolysis step. Such a process is described in U.S. patent application Ser. No. 10/871,622, filed Jun. 18, 2004. The process consists of (a) polycondensing 1,3-propanediol or its dimers or trimers in the presence of an acid polycondensation catalyst at a temperature of at least about 150° C. to obtain a polytrimethylene ether glycol reaction mixture; (b) adding to the reaction mixture substantially water-insoluble base to neutralize the acid polycondensation catalyst and obtain a neutralized reaction mixture, (c) contacting the neutralized reaction mixture with filter aid having a permeability no greater than about 0.150 Darcy, and (d) separating the polytrimethylene ether glycol from the filter aid, to obtain polytrimethylene ether glycol that is essentially free of end groups derived from the acid catalyst.

The second preferred polytrimethylene homo- or copolyether glycol for use in preparing the products of the invention, poly(trimethylene-ethylene ether)glycol, may be prepared by methods disclosed in U.S. Patent Application Publication No. 2004/0030095. As disclosed there, the poly(trimethylene-ethylene ether)glycol may be prepared by a process comprising the steps of: (a) providing 1,3-propanediol reactant, ethylene glycol reactant and acid polycondensation catalyst; and (b) polycondensing the reactants to form a poly(trimethylene-ethylene ether)glycol. It may also be prepared continuously or semi-continuously using the procedure of U.S. Patent Application Publication No. 2002/10374. The poly(trimethylene-ethylene ether)glycols are preferably prepared using at least about 1 mole %, preferably at least about 2 mole % and more preferably at least about 10 mole %, and preferably up to about 50 mole %, more preferably up to about 40 mole %, and most preferably up to about 30 mole % of ethylene glycol reactant based on the total amount of 1,3-propanediol and ethylene glycol reactants. The poly(trimethylene-ethylene ether)glycols are preferably prepared using up to about 99 mole %, preferably up to about 98 mole %, and preferably at least about 50 mole %, more preferably at least about 60 mole %, and most preferably at least about 70 mole %, of 1,3-propanediol based on the total amount of 1,3-propanediol and ethylene glycol reactants.

The third preferred 1,3-propanediol based homo- or copolyether glycol for use in preparing the products of the invention is random polytrimethylene ether ester. A preferred method for preparation of the random polytrimethylene ether esters is presented in detail in U.S. Pat. No. 6,608,168. The esters are prepared by polycondensation of 1,3-propanediol reactant and about 10 to about 0.1 mole % of aliphatic or aromatic diacid or diester, preferably diacid. By "1,3-propanediol reactant" in the context of this invention is meant polytrimethylene ether glycol and/or poly(trimethylene-ethylene ether)glycol as described above for the first two classes of 1,3-propanediol based homo- or copolyether basestock.

The aliphatic or aromatic diacids or diesters used to prepare the random polytrimethylene ether esters are preferably aromatic dicarboxylic acids or esters selected from the group of terephthalic acid, isophthalic acid, bibenzoic acid, naphthalic acid, bis(p-carboxyphenyl)methane, 1,5-naphthalene dicarboxylic acid, 2,7-naphthalene dicarboxylic acid, 4,4'-sulfonyl dibenzoic acid, p-(hydroxyethoxy)benzoic acid and esters thereof. Most preferred is terephthalic acid. US 2005-0020805 A1 discloses a preferred way to prepare polytrimethylene ether glycols and esters. For use in the present invention the polytrimethylene homo- or copolyethers preferably have a number average molecular weight of from about 250 to about 10,000. More preferably the number average molecular weight range will be between any two of the following possible endpoints, including or excluding the endpoints: 250; 500; 750; 1,000; 1,250; 1,500; 1,750; 2,000; 2,250; 2,500; 2,750; 3,000; 3,250; 3,500; 3,750; 4,000; 4,250; 4,500; 4,750; 5,000; 5,250; 5,500; 5,750; 6,000; 6,250; 6,500; 6,750; 7,000; 7,250; 7,500; 7,750; 8,000; 8,250; 8,500; 8,750; 9,000; 9,250; 9,500; 9,750; and 10,000. The most preferred number average molecular weight range will be from about 1,000 to about 5,000. In addition, the polytrimethylene homo- or copolyethers will preferably have a weight average molecular weight (Mw) to number average molecular weight (Mn) ratio (Mw/Mn ratio) of 1.7 or greater, more preferably greater than 1.7, even more preferably 1.75 or greater, still more preferably 1.8 or greater, even more preferably 1.85 or greater, still more preferably 1.9 or greater, even more preferably 1.95 or greater, and still more preferably 2.0 or greater.

The silicon-containing reactants for reaction with the polytrimethylene homo- or copolyether glycols have the silane structure Si(W)(X)(Y)(Z) where W, X and Y are groups that are easily displaceable from silicon by reaction with water and/or alcohols, and Z is selected from the group consisting of: $C_1$-$C_{20}$ linear or branched alkyl groups; cycloaliphatic groups; aromatic groups, each being optionally substituted with a member selected from the group consisting of O, N, P and S; and groups that are easily displaceable from silicon by water and/or alcohol. Examples of moieties directly bonded to silicon which are easily displaceable by reaction with alcohol or water include but are not limited to alkoxy, aryloxy, acyloxy, amide, carbamate, urea, ketoximine, amine, halogen and imidazole.

Preferred moieties which are easily displaceable by reaction with water or alcohols are alkoxy and aryloxy groups having from 1 to 20 carbon atoms. Illustrative of alkyl and aryl radicals bound to oxygen in the alkoxy and/or aryloxy radicals are, for example, alkyl radicals, e.g., methyl, ethyl, propyl, butyl, octyl, etc.; aryl radicals, e.g., phenyl, tolyl, xylyl, naphthyl, etc.; aralkyl radicals, e.g. benzyl and phenylethyl; olefinically unsaturated monovalent radicals, e.g. vinyl, allyl, cyclohexenyl, etc.; and cycloalkyl radicals such as cyclohexyl, cycloheptyl, etc. More preferred moieties which are easily displaceable by reaction with water or alcohols are $C_1$-$C_{12}$ alkoxyl groups, even more preferred are $C_1$-$C_3$ alkoxyl groups, and most preferred are ethoxyl groups.

As indicated above, the Z moiety in the silicon-containing reactant of formula Si(W)(X)(Y)(Z), can also be a member of the group consisting of $C_1$-$C_{20}$ linear or branched alkyl groups, cycloaliphatic groups, aromatic groups, each being optionally substituted with a member selected from the group consisting of O, N, P and S. Examples include, but are not limited to methyl, ethyl, isobutyl, octyl, isooctyl, vinyl, phenyl and cyclohexyl. Examples of the silanes operable in the invention include, but are not limited to: tetramethoxysilane, tetraethoxysilane, tetrapropoxysilane, methyltrimethoxysilane, methyltriethoxysilane, methyltripropoxysilane, ethyltrimethoxysilane, ethyltriethoxysilane, ethyltripropoxysilane, propyltrimethoxysilane, propyltriethoxysilane, propyltripropoxysilane, isobutyltrimethoxysilane, isobutyltriethoxysilane, isobutyltripropxysilane, octyltrimethoxysilane, octyltriethoxysilane, octyltripropoxysilane, isooctyltrimethoxysilane, isooctyltriethoxysilane, isooctyltripropoxysilane, vinyltrimethoxysilane, vinyltriethoxysilane, vinyltripropoxysilane, phenyltrimethoxysilane, phenyltriethoxysilane, phenyltripropoxysilane. The tetraalkoxysilanes (also known as tetraalkyl orthosilicates) are preferred. Most preferred is tetraethoxysilane, or tetraethyl orthosilicate.

The silylation reaction of the polytrimethylene homo- or copolyether glycols with the silicon-containing reactants is readily carried out, usually at elevated temperatures of from about 80 to about 150° C., while removing volatile by-products. Generally at least about 1 mole of reactant is used for each equivalent of hydroxyl groups in the homo- or copolymer. More volatile reactants, e.g. tetraethyl orthosilicate, can be used in excess, and any excess can be removed at the end of reaction by vacuum distillation. The reaction is conveniently carried out in a solvent. Aromatic hydrocarbons such as xylene are preferred solvents; however, any solvent that is inert to the reactants and conveniently removable is satisfactory. General conditions for carrying out the reaction of silanes with polyols are disclosed in U.S. Pat. No. 6,080,816. Depending upon the reactivity of the silicon-containing reactant, it may be desirable to employ a catalyst for the silylation reaction. In cases where a catalyst is necessary yet it is desirable to have product essentially free of catalysts, catalysts which can be effectively and conveniently removed from the products are preferred. Particularly useful are heterogeneous catalysts such as fluorosulfonic acid (NAFION® NR-50; DuPont), which can be easily separated from the product. Other preferred catalysts are volatile catalysts such as trifluoroacetic acid, amines or thermofugitive catalysts such a tetraalkylammonium hydroxides, which can be substantially removed by a postheating step. Many other useful catalysts can be employed and removed after reaction by passing the product through appropriate ion exchange or absorbing media. Examples of other useful catalysts include but are not limited to medium and strong acids or bases such as sulfonic acids, alkali bases; ammonium salts; tin containing compounds such as dibutyltin dilaurate, dibutyltin diacetate, dibutyltin dioctate, dibutyltin dioxide; titanates such as tetraisopropyl titanate, tetrabutyl titanate (DuPont T Y Z O R, aluminum titanate, aluminum chelates, zirconium chelate and the like. The reaction of the polytrimethylene homo- or copolyether glycols with the silicon-containing reactants involves replacement of at least a portion of the hydroxyl end groups of the polyether with silicon-containing end groups having the formula: —O—Si(X)(Y)(Z), wherein X and Y and Z are as described above. Thus the product will consist largely of polymer or copolymer with these end groups. However, secondary reactions are also possible where the end groups can further react with hydroxyl groups on one or more additional molecules of homo- or copolyether to displace X, Y or Z groups and yield chain extended or branched structures. In that case, in addition to X, Y and Z being groups that are easily displaceable from silicon by reaction with water and/or alcohols, alkyl groups, aromatic groups or cycloaliphatic groups as described above, they may also be residues of the starting polymer or copolymer. In general then, when X, Y and Z are —$OR_1$, —$OR_2$ and —$OR_3$, R1, R2 and R3, which can be the same or different, can be selected from the group consisting of C1-C12 monovalent hydrocarbon radicals, —PX OH, and —PX OSi(—$OR_1$)(—$OR_2$)(—$OR_3$), where PX represents the polymer chain of polytrimethylene ether, poly(trimethylene-ethylene ether), or random poly(trimethylene ether ester). To illustrate the above with a specific example, in the case where the starting polytrimethylene homo- or copolyether glycol is polytrimethylene ether glycol, and the silicon-containing reactant is tetraalkyl orthosilicate, Si(OR)$_4$, X, Y and Z can be, in addition to alkoxyl groups —OR, the following:

—O(CH$_2$CH$_2$CH$_2$O—)nH and

—O(CH$_2$CH$_2$CH$_2$O—)nSi(X)(Y)(Z), where X, Y and Z are alkoxy groups or residues of the starting polymer or copolymer and n is from 2 to about 200. Analogous structures may be written for poly(trimethylene-ethylene ether)glycol and random poly(trimethylene ether ester), silicon-containing reactants containing other groups easily displaceable by water or alcohols. To the extent that this chain extension and/or branching occurs, it will increase the degree of polymerization and molecular weight of the product.

The functionality (i.e., reactive functional groups per polymer chain) of the polytrimethylene homo- or copolyether glycol starting materials is 2. The silylation reaction described herein may increase functionality. For example, when the silicon-containing reactant is tetraalkyl orthosilicate, polymer having silicon groups on both chain ends will have its functionality increased from the original 2 to at least 6 for the linear homo- or copolyether starting materials, and possibly even higher than 6 in the branched materials described above. The increase in functionality is due to the reactivity to water and alcohols of the alkoxyl groups on silicon.

The reactivity and increased functionality of the products of the invention make them particularly useful as crosslinking agents for organic polyols, in particular organic polyols that are film forming compounds. These crosslinked organic polyols provide compositions such as coatings, adhesives, inks, and sealants. Preferably, the polyol for use in these applications is one selected from the group consisting of acrylics, cellulosics, urethanes, polyesters, and epoxides.

An example of these crosslinking applications for the silicon-containing polytrimethylene homo- or copolyethers of the invention is as a crosslinking component of UV curable inks and coatings. In UV curable cationic coatings, photoinitiators generate cationic catalyst species, which then function as catalysts for cationic polymerization. Typical monomers/oligomers for the cationic coatings are vinyl ethers, propenyl ethers, or epoxide containing compounds. Vinyl ethers, propenyl ethers or epoxide-containing compounds, in particular cycloaliphatic epoxides, are the major reactive monomers/oligomers used for cationic UV cured coatings, as discussed by Wu et al. *Polymer*, 40 (1999), pp. 5675-5686. Two types of crosslinkers are widely used for these coatings, low molecular weight alcohols and high molecular weight polyols. Polytrimethylene homo- or copolyether glycols can be used as a crosslinker for cationic UV curable coatings. However, they have a functionality of only 2. On the other hand, their silicon-containing derivatives have functionalities greater than the original 2. Therefore they would be expected to function as crosslinkers at lower levels than the original glycols, with the possible added advantage of lower viscosity due to replacement of at least some of the hydrogen bonding hydroxyl groups with siloxane groups.

A further advantage of the silicon-functionalized polytrimethylene homo- or copolyethers as compared to their parent homo- or copolyethers glycols for use in coatings and inks is the reduced viscosity due to the replacement of the hydroxyl groups by the Si groups. The viscosity can be fine tuned by the extent of siloxane functionalization and by the molecular weight of the starting polymer or copolymer.

The invention is illustrated in the following examples. All parts, percentages, etc., referred to in this application (including the examples) are by weight unless otherwise indicated.

EXAMPLES

The 1,3-propanediol utilized in the examples was prepared by biological methods and had a purity of >99.8%. Polytrimethylene ether glycol of varying molecular weights used in the examples was prepared by the methods described in U.S. Patent 25 Application Publication No. 2002/0007043.

Example 1

This example illustrates preparation of siloxane functionalized 1,3-propanediol. 1,3-Propanediol (36.5 g) was added to a 500 ml., four neck round bottom flask. The flask was equipped with a mechanical stirrer (60 rpm), a reflux condenser with cooling water, a thermocouple for temperature monitoring and a nitrogen sparging tube which provided nitrogen gas flow of 263 ml/minute. Tetraethyl orthosilicate (299.6 g, 1.44 mole, 98% purity), 35 g of o-xylene and 1.17 g of dibutyltin dilaurate were transferred into the reaction flask using syringes. The mixture was refluxed at 97-102° C. for 4 hours. Then the xylene and excess tetraethyl orthosilicate were removed in vacuum using a BUCHI VACUUM ROTOVAPOR at 75° C. for 5 hours at 12 Torr. The residual liquid product was analyzed by NMR for identification of composition. Based on the NMR results, the reaction yield was 83%.

The FT-IR spectrum of the siloxane functionalized 1,3-propanediol was obtained. The IR spectra of pure tetraethyl orthosilicate and the siloxane functionalized product were very similar. The spectra of both confirmed the presence of the absorption bonds of: methyl groups (CH$_3$, asym, stretching) at 2975 cm$^{-1}$, two different methylene groups (CH$_2$, stretching, sym and asym) at 2929 and 2888 cm$^{-1}$, Si—O—C (asym) at 1168, and 1072 cm$^{-1}$, Si—O at 958 cm$^{-1}$, Si—O—C at 786 cm$^{-1}$ (sym), OH at 3450 and 3550 cm$^{-1}$ (hydroxyl groups were detected in spectrum of the resultant due to the presence of non-reacted 3G, and C—O—C at 1100-1070 cm$^{-1}$ (overlapping with Si—O—C).

There are 8 C—H bonds due to CH2 groups in the spectrum of tetraethyl orthosilicate and 12 C—H bonds due to similar CH2 groups in the siloxane functionalized 1,3-propanediol. On the other hand, there are 12 C—H bonds due to CH3 groups in tetraethyl orthosilicate and also 12 C—H bonds due to similar CH3 groups in the siloxane functionalized 1,3-propanediol. Therefore, the ratio of numbers of C—H bonds in CH3 groups to the numbers of C—H bonds in CH2 groups in tetraethyl orthosilicate (12/8) was greater than the same ratio in resultant siloxane functionalized 1,3-propanediol (12/12). This ratio can be calculated by dividing the intensity of absorption bonds in the CH3 peak (2975 cm$^{-1}$, CH$_3$, asym) to the intensity of any C—H absorption bonds due to CH2 (for example, peak at 2888 cm$^{-1}$, CH2 asym). As expected, this ratio in tetraethyl orthosilicate was greater than the similar ratio in the siloxane functionalized 1,3-propanediol.

The H-NMR spectrum of tetraethyl orthosilicate showed the presence of an ethyl group (CH$_3$, δ 1.9-1.3; CH$_2$, δ 3.8-3.9). In an ethyl group the multiplicity of the peak related to CH3 is triplet, and the multiplicity of the peak related to CH2 is quartet. Furthermore, the ratio of the integration related to CH2 groups (6 3.8-3.9) to the integration related to CH3 groups (6 1.3-1.9) was 66.6%. This number was expected since the numbers of protons in the tetraethyl orthosilicate CH2 groups is 8, and the numbers of protons in CH3 groups is 12 (the ratio is equal to 8/12 which is 66.6%). In the H-NMR spectrum of siloxane functionalized 1,3-propanediol there were similar peaks for ethyl group (CH$_3$, 6 1.9-1.3, CH$_2$, 6 3.8-3.9). Because of the two different CH2 groups in siloxane functionalized 1,3-propanediol (CH$_2$CH$_2$O and OCH$_2$CH$_3$) and the slightly different environments of ethyl groups in siloxane functionalized 1,3-propanediol, the triplet and quartet structures at 6 3.8-3.9 and 1.3-1.9 displayed a more complex splitting pattern. Finally, there were some other weak peaks, which probably represent the presence of components such as the aliphatic CH3 and aromatic CH2 groups in xylene, the middle and end CH2 group in 1,3-propanediol, and the CH2 group between two carbons in the siloxane functionalized 1,3-propanediol.

The C-NMR spectra were the most useful analysis method for siloxane functionalized 1,3-propanediol structure determination. C-NMR of pure tetraethyl orthosilicate clearly indicated the 1/1 (4/4) ratio of CH2 carbons (−59) to CH3 carbons (−18). This ratio changed to 111.67/100.00 in the C-NMR of resultant siloxane functionalized 1,3-propanediol. Consequently, the expansion of CH2 peak at −59. split the peak into two separate peaks with different integration (however, area of 111.67 covers both peaks). The peak with shorter integration might be due to carbons at CH$_2$CH$_2$O groups and the adjacent peak might be due to carbons in CH2 groups at OCH$_2$CH$_3$. The carbon resonance for the end CH2 groups in 1,3-propanediol appeared at −59.9. The yield of the reaction was calculated based on the area under peaks (integration) of CH$_3$, CH2 of the siloxane functionalized 1,3-propanediol and tetraethyl orthosilicate and CH$_2$OH of 1,3-propanediol.

Example 2

This example illustrates preparation of siloxane functionalized polytrimethylene ether glycol of approximately 1,000 number average molecular weight.

The procedure described in Example 1 was used for silylation of polytrimethylene ether glycol of about 1,000 number average molecular weight. In this example, polytrimethylene ether glycol (258.9 g) (Mn=1079, 0.24 mole), 149.7 g tetraethyl orthosilicate (0.72 mol), 38.3 g xylehe and 1.3 g dibutyltin dilaurate were mixed in the reaction flask. The mixture was allowed to react at reflux temperature of 128° C. for 4 hours, followed by vacuum separation of the xylene, the ethanol byproduct and the excess tetraethyl orthosilicate at 90° C. at 10 Torr for 5 hours.

Proton and carbon-13 NMR analyses indicated that the product had the original polytrimethylene ether backbone structure, but all hydroxyl ends had been converted to siloxane groups. The number average molecular weight was found to have increased from 1,079 to 1,594, corresponding to an increase in degree of polymerization (DP) from 18 to 21. This 17% increase in DP demonstrates chain extension or branching due to the secondary reaction from the siloxane endgroups. Light scattering and gel permeation chromatography (GPC) showed that the product sample had a molecular weight dispersity of 2.

Silicone NMR of the product indicated that there were two Si signals in peak intensity ratio of 6 to 1, thus confirming the minor Si side reaction for chain extension or branching.

Based on the NMR molecular weight data, the siloxane functionalization of polytrimethylene ether glycol underwent the following reaction:

H—(OCH$_2$CH$_2$CH$_2$)$_n$OH+2Si(—OCH$_2$CH$_3$)$_4$Si (—OCH$_2$CH$_3$)$_4$—→Si(—OCH$_2$CH$_3$)$_3$—O—(CH$_2$CH$_2$CH$_2$O—)$_n$Si(—OCH$_2$CH$_3$)$_3$+2+minor chain extended and branched product.

The molecular weight and thermal transitions of the product from this example are shown in Table 1.

TABLE 1

Siloxane Functionalization of Polytrimethylene ether Glycol of Approximately 1,000 Molecular Weight

| Sample | Mn by NMR | DP | Tm$^a$ (° C.) | Tg$^b$ (° C.) | Tc$^c$ (° C.) | Wt % Si |
|---|---|---|---|---|---|---|
| Starting Glycol | 1,079 | 18 | 15.6 | −80.8 | 37.6 | 0 |
| Siloxane Product | 1,594 | 21 | −3.34 | −88.9 | −57.2 | 4.6 |

$^a$melting point,
$^b$glass transition temperature,
$^c$crystallization temperature

Example 3

This example illustrates preparation of siloxane functionalized polytrimethylene ether glycol of about 2,000 number average molecular weight.

The same procedure described in Example 1 was used for siloxane functionalization of polytrimethylene ether glycol of about 2,000 molecular weight. Polytrimethylene ether glycol (243.9 g) (Mn=2,032, 0.12 mol), 74.8 g of tetraethyl orthosilicate (0.36 mol), 30.7 g xylene and 1.1 g dibutyltin dilaurate were mixed in the reaction flask. The mixture was allowed to reflux at 141° C. for 4 hours, followed by vacuum separation of xylene, the ethanol byproduct and the excess tetraethyl orthosilicate at 90° C. and 10 Torr for 5 hours.

Proton and carbon-13 NMR analyses showed that the resultant polymer had the original polytrimethylene ether polymer backbone structure, and that all of the hydroxyl end groups had been converted to siloxane groups. The number average molecular increased from 2,032 to 3,269, corresponding to an increase of degree of polymerization (DP) from 34 to 50. This increase in DP of 49%, indicates the substantial chain extension and/or branching due to the secondary reaction from the siloxane endgroups under the reaction conditions shown in this example.

The molecular weight and thermal transitions of the product from this example are shown in Table 2.

TABLE 2

Siloxane Functionalization of Polytrimethylene ether Glycol of Approximately 2,000 Molecular Weight

| Sample | Mn by NMR | DP | Tm$^a$ (° C.) | Tg$^b$ (° C.) | Tc$^c$ (° C.) | Wt % Si |
|---|---|---|---|---|---|---|
| Starting Glycol | 2,032 | 34 | 18.2 | −76.3 | not available | 0 |
| Siloxane Product | 3,269 | 50 | 8.14 | −88.6 | −47.5 | 2.8 |

$^a$melting point,
$^b$glass transition temperature,
$^c$crystallization temperature

Example 4

This example illustrates the change in viscosity that occurs upon siloxation of 1,3-propanediol based homo- or copolyether. For examples 1, 2 and 3 above, viscosities were determined on starting glycols and the siloxane-treated products. The data are presented in Table 3.

TABLE 3

| Example | Sample | Viscosity at 40° C. (cP) | Viscosity at 60° C. (cP) |
|---|---|---|---|
| 1 | Starting Glycol | 21.0 | 10.3 |
| 1 | Siloxane Product | 1.8 | 1.3 |
| 2 | Starting Glycol | 207.9 | 92.7 |
| 2 | Siloxane Product | 141.0 | 81.4 |
| 3 | Starting Glycol | 666.2 | 295.6 |
| 3 | Siloxane Product | 1271.0 | 643.3 |

It is believed that in examples 1 and 2 the viscosity decreases because after the reaction with siloxane, the hydroxyl groups in the polymer ends are converted to siloxane groups, and the reduction of the hydrogen bonding and the interactions of OH functions leads to lower viscosity. In examples 1 and 2, the starting molecular weight is relatively low, and the secondary siloxane reaction, which leads to branching and crosslinking, is relatively minor. This is demonstrated by the data in Table 1 indicating that in example 2, the DP changes from 18 to only 21. In example 3, however, the starting polyglycol molecular weight is higher, and the secondary reaction becomes more competitive. As shown in Table 2, the DP changes from 34 to 50 after the siloxane reaction. Apparently, in this example the branching and crosslinking of the polymer due to the secondary reactions more than compensates for the OH interaction effect.

Determination of Degree of Polymerization and Molecular Weight for Examples 1 and 2

Carbon NMR can distinguish the carbons corresponding to the end ether groups beside the siloxane groups (B1) from that of the middle ether groups (B), and thus it was possible to calculate the molecular weight by comparing the integral area of these two peaks. The integral areas correspond to n carbons (B) for the middle ether groups as well as 2 carbons (B1) for the end ether groups beside the siloxane groups.

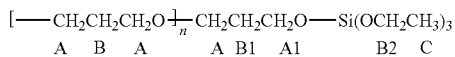

Therefore, the integral area of B associated with n carbons=Integral area of B1 associated with 2 carbons=n/2

Since n represents the number of middle ether groups, the total numbers of middle ether groups plus the two end ether groups beside the siloxane groups provides the degree of polymerization: DP=n+2

The number average molecular weight will be given by:

$$Mn = (DP \times 58.08) + 342.16$$

For example, the molecular weights calculated for the products from examples 2 and 3 were calculated as follow:

Example 2

| | |
|---|---|
| Relative integral area for B | 519.16 |
| Relative integral area for B1 | 53.06 |
| B/B1 | 519.16/53.06 |
| DP | 21.57 |
| Mn | (21.57 × 58.08) + 342.16 = 1594.90 g/mol |
| Total end groups | 2 × 10$^6$/Mn = 1253.9 meq/kg |

Example 3

| | |
|---|---|
| C-NMR AS# | 4400 |
| Relative integral area for B | 404.4 |
| Relative integral area for B1 | 16.7 |
| B/B1 | 404.4/16.7 |
| DP | 50.4 |
| Mn | (50.4 × 58.08) + 342.16 = 3269.30 g/mol |
| Total end groups | 2 × 10$^6$/Mn = 611.8 meq/kg |

The molecular weight and the degree of polymerization of the polytrimethylene ether glycol reactants for example 2 were 1,079 and 18.27, and for example 3 were 2,032 and 34.12 respectively. The total end groups (meq/kg) can be calculated from the expression: 2×10$^6$/Mn. The total end groups for the polytrimethylene ether glycol reactants for examples 2 and 3 were 1853 meq/kg, and 984.2 meq/kg respectively.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the disclosure.

What is claimed is:

1. A process for preparing a silicon-containing polytrimethylene homo- or copolyether comprising:
    providing reactants comprising:
    (c) polytrimethylene homo- or copolyether ether glycol, wherein from about 50 to 100 mole mole percent of the repeating units of the polytrimethylene homo- or copolyether are trimethylene ether units, and wherein the polytrimethylene homo- or copolyether has an Mw/Mn ratio of 1.7 or greater; and
    (d) a silicon-containing reactant of the formula: Si(W)(X)(Y)(Z), where W, X and Y are groups that are easily displaceable from silicon by reaction with water and/or alcohols, and Z is selected from the group consisting of: (i) C1-C$_{20}$ linear or branched alkyl groups, (ii) cycloaliphatic groups, (iii) aromatic groups, each of (i), (ii) and (iii) being optionally substituted with a member selected from the group consisting of O, N, P and S, (iv) hydrogen, and (v) groups that are easily displaceable from silicon by water and/or alcohol; and
    contacting said polytrimethylene homo- or copolyether ether glycol reactant in (c) with said silicon-containing reactant in (d) at elevated temperature.

2. The process of claim 1, wherein the groups that are easily displaceable from silicon by reaction with water and/or alcohols are selected from the group consisting of alkoxy groups, aryloxy groups, acyloxy groups, amide groups, carbamate groups, urea groups, ketoximine groups amine groups and halogens.

3. The process of claim 1, wherein the silicon-containing reactant is a tetraalkyl orthosilicate.

4. The process of claim 3, wherein the reactants further comprise a siloxation catalyst.

5. A silicon-containing polytrimethylene homo- or copolyether ether prepared by the process of claim 3.

6. A silicon-containing polytrimethylene homo- or copolyether prepared by the process of claim 1.

7. A silicon-containing polytrimethylene homo- or copolyether prepared by a process comprising providing and reacting (i) polytrimethylene homo- or copolyether ether glycol containing from about 50 to 100 mole percent trimethylene ether units, based upon the repeating units of the polytrimethylene homo- or copolyether, selected from the group consisting of (i) polytrimethylene ether glycol, (ii) poly(trimethyleneethylene ether) glycol, and (iii) random poly (trimethylene ether ester), and (ii) at least one tetraalkoxylsilane; wherein the polytrimethylene homo- or copolyether has an Mw/Mn ratio of 1.7 or greater.

8. The silicon-containing polytrimethylene homo- or copolyether of claim 7, wherein the tetraalkoxy silane comprises tetraethoxy silane and wherein the reacting is carried out at a temperature of about 80 to about 150° C.

* * * * *